(12) United States Patent
Suzuki et al.

(10) Patent No.: US 10,452,325 B2
(45) Date of Patent: Oct. 22, 2019

(54) INFORMATION PROCESSING APPARATUS AND INFORMATION PROCESSING METHOD

(71) Applicant: SEIKO EPSON CORPORATION, Tokyo (JP)

(72) Inventors: Hiroyuki Suzuki, Shiojiri (JP); Kyoichi Kamijama, Shiojiri (JP); Kazuya Nishiwaki, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 15/988,942

(22) Filed: May 24, 2018

(65) Prior Publication Data

US 2018/0341433 A1    Nov. 29, 2018

(30) Foreign Application Priority Data

May 29, 2017   (JP) ................................ 2017-105372

(51) Int. Cl.
*H04N 1/04* (2006.01)
*G06F 3/12* (2006.01)
*H04L 12/841* (2013.01)

(52) U.S. Cl.
CPC ............ *G06F 3/121* (2013.01); *G06F 3/1234* (2013.01); *G06F 3/1235* (2013.01); *G06F 3/1273* (2013.01); *G06F 3/1285* (2013.01); *H04L 47/28* (2013.01); *G06F 3/122* (2013.01); *G06F 3/1203* (2013.01)

(58) Field of Classification Search
CPC ......... G06F 3/121; G06F 3/1235; H04L 47/28
USPC ....................................................... 358/1.14
See application file for complete search history.

(56) References Cited

U.S. PATENT DOCUMENTS

2008/0104585 A1* 5/2008 Kamijima ................. G06F 8/65
                                                                 717/171

FOREIGN PATENT DOCUMENTS

JP              2014-053027 A        3/2014

* cited by examiner

*Primary Examiner* — Houshang Safaipour
(74) *Attorney, Agent, or Firm* — Workman Nydegger

(57) ABSTRACT

An information processing apparatus that transmits a plurality of parameter values of a device to an external apparatus includes a first transmission section that selectively periodically transmits the plurality of parameter values or part of the plurality of parameter values, and a second transmission section that transmits the plurality of parameter values to the external apparatus, in a case where an amount of change in a predetermined parameter value included in the part of the plurality of parameter values satisfies a predetermined condition in a period between a previous periodic transmission and a current periodic transmission, after the predetermined condition is satisfied and before the current periodic transmission is performed.

8 Claims, 3 Drawing Sheets

INFORMATION PROCESSING APPARATUS AND INFORMATION PROCESSING METHOD

BACKGROUND

1. Technical Field

The present invention relates to an information processing apparatus and the like that notify an external apparatus of device information, and particularly to an information processing apparatus and the like capable of suppressing congestion of communication traffic while performing necessary information communication.

2. Related Art

In some cases, the status of devices such as printers is obtained using a management apparatus such as a server, and management of consumables of the devices and management of faults of the devices are carried out.

Generally, in such cases, the device to be managed and the management apparatus are connected via a network, and device information indicating the status of the devices is transmitted from the devices to the management apparatus at a predetermined time.

In relation to this, JP-A-2014-53027 discloses a monitoring control method for shortening a monitoring interval at which a device management apparatus monitors a printer in a case where the number of printed sheets exceeds a threshold.

However, according to the method described in the above-mentioned JP-A-2014-53027, since the monitoring frequency increases in a case where the management value exceeds the threshold, communication traffic may be congested in a case where there is a large number of devices to be monitored.

In addition, with the spread of network communication, it is expected that the number of occasions when devices for personal use are managed will also increase. Thus, further reduction in communication traffic is desired.

SUMMARY

Accordingly, an advantage of some aspect of the invention is to provide an information processing apparatus and the like that notify an external apparatus of device information, in which the information processing apparatus and the like are capable of suppressing congestion of communication traffic while performing necessary information communication.

According to one aspect of the invention, an information processing apparatus that transmits a plurality of parameter values of a device to an external apparatus includes a first transmission section and a second transmission section. The first transmission section selectively periodically transmits the plurality of parameter values or part of the plurality of parameter values. In a case where an amount of change in a predetermined parameter value included in the part of the plurality of parameter values satisfies a predetermined condition in a period between a previous periodic transmission and a current periodic transmission, the second transmission section transmits the plurality of parameter values to the external apparatus after the predetermined condition is satisfied and before the current periodic transmission is performed.

According to the above aspect, sufficient device information can be sent at an appropriate time, and congestion of communication traffic to the external apparatus can be reduced, even when a plurality of devices are present.

Further, it is preferable that the first transmission section transmit the plurality of parameter values to the external apparatus in the current periodic transmission in a case where the second transmission section does not transmit the plurality of parameter values to the external apparatus within the period, and the first transmission section transmit the part of the plurality of parameter values to the external apparatus in the current periodic transmission in a case where the second transmission section transmits the plurality of parameter values to the external apparatus within the period.

In this case, it is possible to prevent an insufficient amount of information from being transmitted to the external apparatus.

Further, it is preferable that the second transmission section transmit the plurality of parameter values to the external apparatus in a case where the amount of change in the predetermined parameter value after the previous periodic transmission exceeds a predetermined threshold in the period.

In this case, it is possible to send a prompt notification to the external apparatus.

Further, it is preferable that the second transmission section change a value of the threshold to perform transmission of the plurality of parameter values once in the period.

In this case, it is possible to transmit necessary information to the external apparatus at an appropriate time.

Further, it is preferable that the second transmission section increase the value of the threshold when the second transmission section transmits the plurality of parameter values to the external apparatus, and the first transmission section decrease the value of the threshold in the current periodic transmission in a case where the second transmission section does not transmit the plurality of parameter values to the external apparatus in the period.

In this case, it is possible to cause change-related transmission to be performed at an appropriate frequency.

Further, it is preferable that an amount by which the value of the threshold is decreased be larger than an amount by which the value of the threshold is increased.

In this case, it is possible to facilitate occurrence of the change-related transmission, and thus a frequency of transmitting device information to the external apparatus is maintained appropriately and congestion of communication traffic is reduced.

Further, it is preferable that the threshold have an upper limit value and a lower limit value.

Further, it is preferable that the second transmission section transmit a predetermined parameter value of the part of the plurality of parameter values to the external apparatus, after the second transmission section transmits the plurality of parameter values to the external apparatus in the period, in a case where an amount of change in the predetermined parameter value satisfies a predetermined condition in a period identical to the above period.

In this case, it is possible to perform appropriate and efficient information communication.

According to another aspect of the invention, an information processing method for transmitting a plurality of parameter values of a device to an external apparatus includes transmitting selectively periodically the plurality of parameter values or part of the plurality of parameter values, and transmitting the plurality of parameter values to the external apparatus in a case where an amount of change in a predetermined parameter value included in the part of the plurality of parameter values satisfies a predetermined condition in a period between a previous periodic transmission and a current periodic transmission, after the predetermined condition is satisfied and before the current periodic transmission is performed.

Further objects and features of the present invention will become apparent from the embodiments of the invention described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
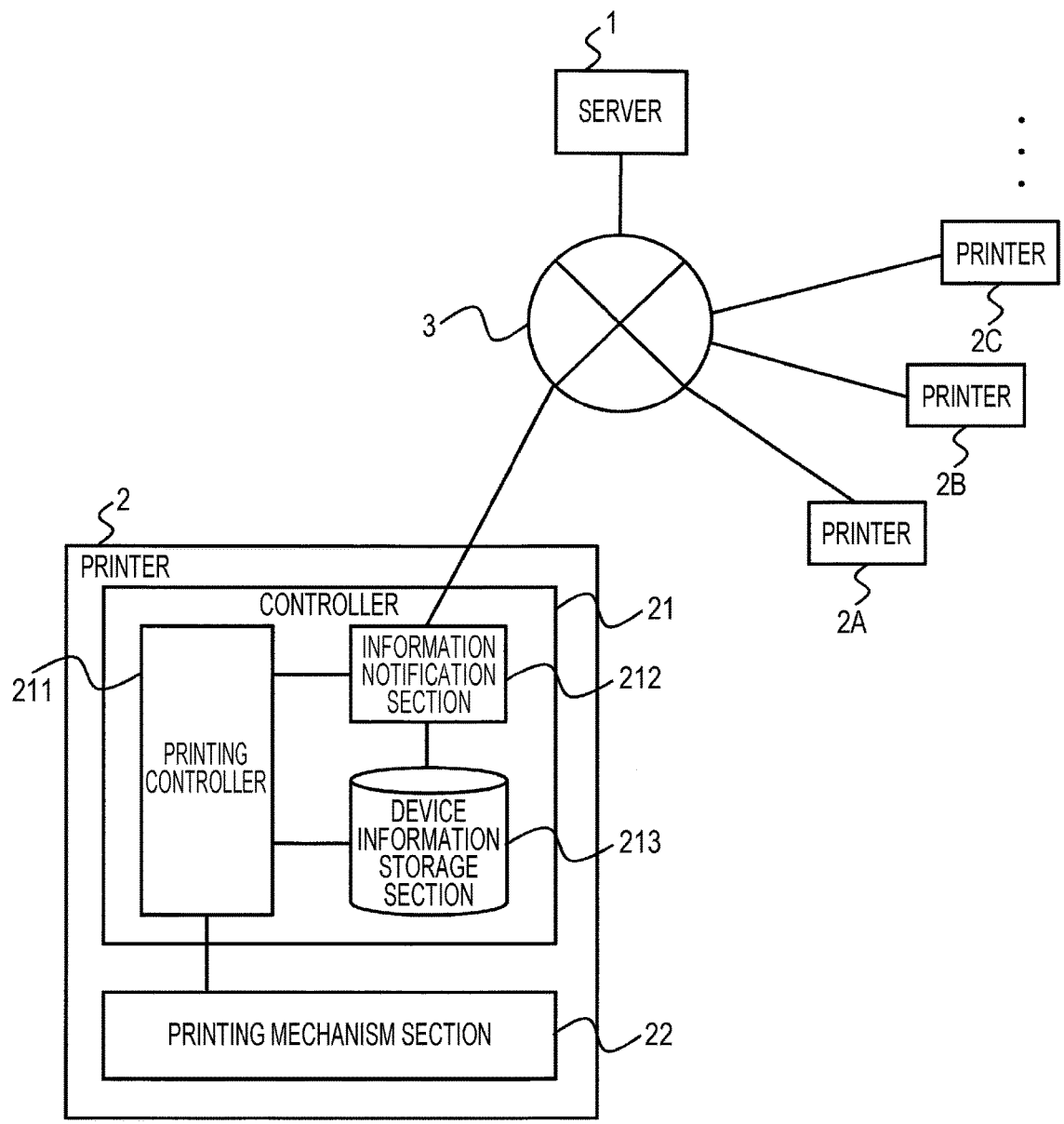
FIG. 1 is a schematic structural diagram of a printer including an information processing apparatus to which the invention is applied.

The embodiments of the invention will be described below with reference to the drawings. However, such embodiments place no limitation on the technological scope of the invention. Note that, in the drawings, the same or similar components are denoted by the same reference numerals or reference symbols.

FIG. 1 is a schematic structural diagram of a printer including an information processing apparatus to which the invention is applied. An information notification section 212 illustrated in FIG. 1 is the information processing apparatus to which the invention is applied, and the information notification section 212 notifies (transmits to) a server 1 of device information of a printer 2, which is a device to be managed. The information notification section 212 performs control so that change-related transmission is performed approximately once between periodic transmissions, transmits all device information to the server 1 when the change-related transmission is performed, and transmits only significant device information to the server 1 when the periodic transmission is performed. This makes it possible to transmit adequate device information at an appropriate time and to suppress congestion of communication traffic to the server 1 by increasing an amount of information in the change-related transmission which is not likely to overlap in time with transmission from other devices.

Note that the periodic transmission means transmitting device information at a predetermined constant time interval, and the change-related transmission means transmitting device information at a time when the state of the device changes, more specifically, at a time when a predetermined parameter value shows a predetermined amount of change. In addition, the device information includes values of various parameters representing the state (status) of the device to be managed, and in the embodiment of the invention, the device information is information on, for example, the number of sheets printed by the printer 2 and a remaining amount of coloring material.

As illustrated in FIG. 1, the embodiment of the invention assumes that the server 1 appropriately acquires device information of a plurality of printers 2, 2A, 2B, 2C, . . . which are connected via a network 3 such as the Internet, and performs management of consumables in the printers, management of deterioration of the printers, and the like in accordance with the device information.

The server 1 is a management apparatus for the plurality of printers 2, 2A, 2B, 2C, . . . , which are devices to be managed, and is composed of a general server system. The server 1 is operated by, for example, a printer manufacturer and is provided at a predetermined location on the network 3. The server 1 performs services such as issuing a warning of running out of a color material (such as ink), and issuing an announcement prompting purchase of the color material to each printer on the basis of the device information indicating remaining amount of the color material of each printer. In addition, in the case where a charge-based service corresponding to the number of prints is applied to a user of the printer, the server 1 notifies the user of information on the charge or the like on the basis of the number of printed sheets as the device information.

The printer 2 is one of the devices to be managed by the server 1. Note that other printers 2A, 2B, 2C, . . . which are illustrated in FIG. 1 have the same configuration as the printer 2 described below.

The printer 2 is a printing device that performs printing on a printing medium such as a sheet in response to a print request from a host device (not shown), and is, for example, an ink jet printer.

As illustrated in FIG. 1, the printer 2 includes a controller 21 and a printing mechanism section 22. The controller 21 is a controller for controlling each portion of the printer 2 and includes a CPU, a RAM, a ROM, an NVRAM, an ASIC (Application Specific Integrated Circuit), and the like as a hardware configuration.

As illustrated in FIG. 1, the controller 21 includes a printing controller 211, an information notification section 212, and a device information storage section 213 as a functional configuration. The printing controller 211 controls the printing mechanism section 22 to cause the printing mechanism section 22 to perform printing according to the above-described print request.

The information notification section 212 has the function of notifying the server 1 of the device information of the printer 2. As described above, the printer 2 has a characteristic feature in the process performed by the information notification section 212, and details of the characteristic feature will be described later. Note that the information notification section 212 includes a program instructing the information notification section 212 of a process to be executed by the information notification section 212, a CPU operating in accordance with the program, a ROM for storing the program, a RAM, an NVRAM, a communication interface, and the like.

The device information storage section 213 stores device information of the printer 2. The device information of the printer 2 is roughly divided into two types of information, which are first information including significant parameter information for management and second information including information other than the first information (relatively insignificant parameter information).

For example, the first information includes parameter information (parameter values) such as the cumulative number of printed sheets (number of sheets), the cumulative number of monochrome printed sheets (number of sheets), the cumulative number of color printed sheets (number of sheets), the amount of black ink remaining (%), the amount of cyan ink remaining (%), the amount of magenta ink remaining (%), and the amount of yellow ink remaining (%).

The second information includes information on, for example, an IP address, a manufacturer, a model name, a data collection date and time, status information (during printing, during scanning, during idling, or during power saving), the cumulative number of times of fatal errors (times), the cumulative number of times of paper jamming errors (times), the cumulative number of times of overlapping feeding errors (times), the number of times of exchanging consumables (times), and the like.

The information stored in the device information storage section 213 is stored (updated) by the printing controller 211, for example, when printing is executed. Note that the device information storage section 213 is composed of HD or the like.

The printing mechanism section 22 performs printing on a printing medium (sheet or the like) in accordance with an instruction from the printing controller 211. The printing mechanism section 22 includes a print head, a printing medium transport device, and the like.

Figure 2:
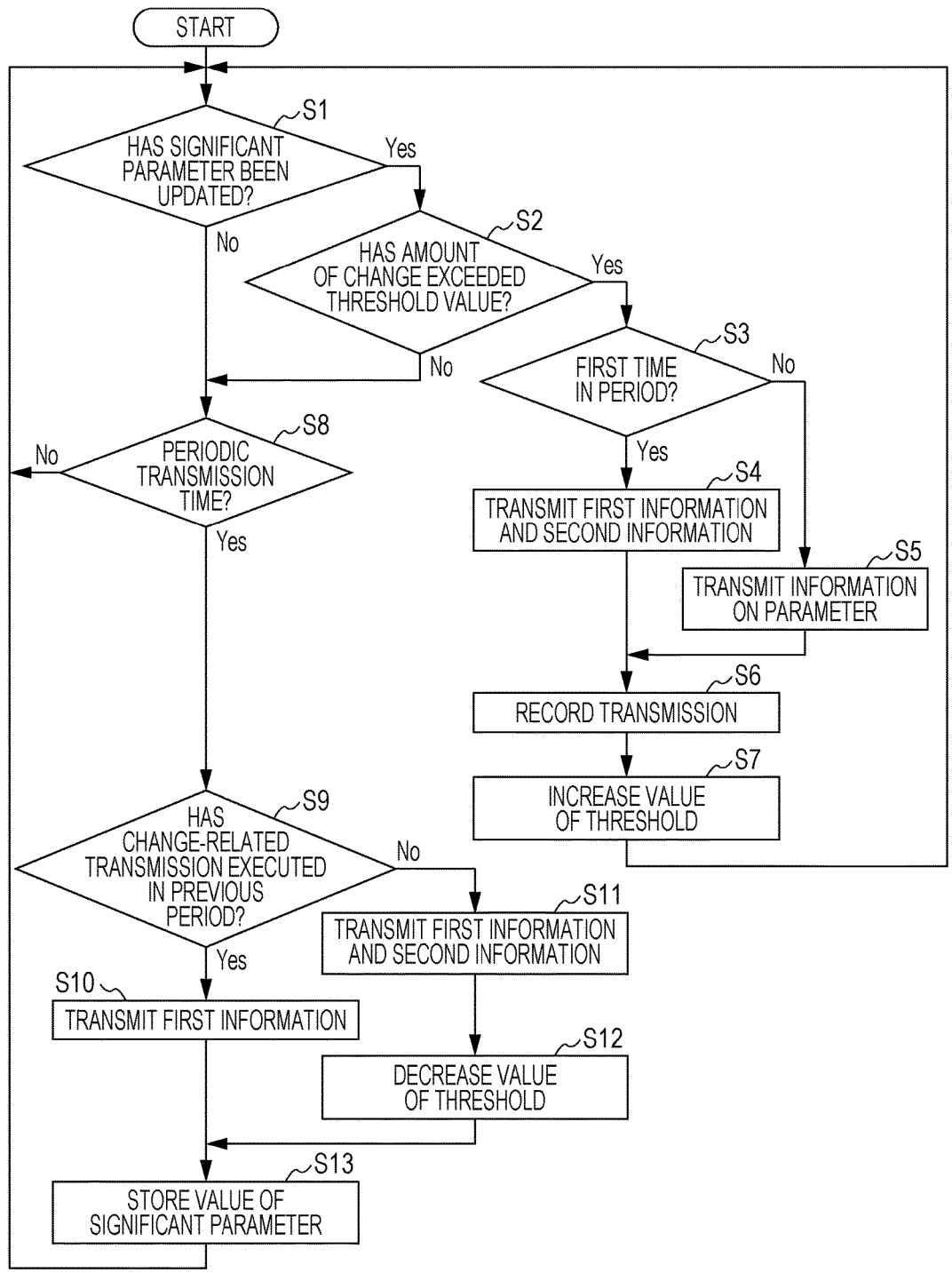
FIG. 2 is a flowchart illustrating steps of a process of notification of device information.

The printer 2 according to the embodiment of the invention having the above-described configuration has a characteristic feature in the process of notification of device information, and the details will be described below. FIG. 2 is a flowchart illustrating steps of the process of notification of the device information. The process performed by the information notification section 212 will be described with reference to FIG. 2.

First, the information notification section 212 decides whether to perform the change-related transmission. Specifically, the information notification section 212 decides whether the value of the parameter (hereinafter, significant parameter) included in the first information has been updated (step S1 in FIG. 2). In this process, by accessing the device information storage section 213, receiving notification from the printing controller 211, or detecting that printing has been performed, the information notification section 212 detects that the significant parameter has been updated.

In a case where the significant parameter has not been updated ("No" in step S1 in FIG. 2), the process proceeds to step S8.

In a case where the significant parameter has been updated ("Yes" in step S1 in FIG. 2), the information notification section 212 decides whether the amount of change in the value of the updated significant parameter (predetermined parameter value included in part of a plurality of parameter values of the device) exceeds a threshold (step S2 in FIG. 2). Here, the amount of change is an amount of change from the value of each significant parameter stored after the last transmission of the device information. Each threshold for a corresponding significant parameter is stored in the NVRAM or the like of the information notification section 212. Default values for these thresholds are stored at the time of starting to use the printer 2, and the default values are then updated by the information notification section 212 as described later. In the decision process, the threshold having been stored at the time of the decision process is used. Note that the threshold has an upper limit value and a lower limit value.

As a result of the decision, in a case where the amount of change does not exceed the threshold ("No" in step S2 in FIG. 2), the process proceeds to step S8.

On the other hand, in a case where the amount of change exceeds the threshold ("Yes" in step S2 in FIG. 2), the information notification section 212 first determines information to be transmitted to the server 1 to perform the change-related transmission. Specifically, the information notification section 212 decides whether it is the first time (for the first time) that the current change-related transmission is performed in a period (hereinafter referred to as the period) between the time of the last periodic transmission and the time of the determination (step S3 in FIG. 2). This decision is made on the basis of the information stored in the process of recording a transmission (step S6) described later.

As a result of the decision, in a case where it is decided that it is the first time (for the first time) that the change-related transmission is performed in the period ("Yes" in step S3 in FIG. 2), the information notification section 212 transmits the first information and the second information to the server 1 (step S4 in FIG. 2). That is, the information notification section 212 transmits all of the information to be notified to the server 1.

On the other hand, in a case where it is decided that it is not the first time (for the first time) that the change-related transmission is performed in the period ("No" in step S3 in FIG. 2), the information notification section 212 transmits information on the significant parameter whose amount of change exceeds the threshold to the server 1 (step S5 in FIG. 2).

In any of the above steps, when the transmission to the server 1 is completed, the information notification section 212 records the transmission (step S6 in FIG. 2). Specifically, the information notification section 212 stores in the NVRAM or the like information on, for example, the fact that the change-related transmission was performed, the date and time of the change-related transmission, the value of the significant parameter at the above date and time, and the like.

Next, the information notification section 212 increases the above-mentioned threshold of each significant parameter by a predetermined amount (step S7 in FIG. 2). This process makes it difficult for the change-related transmission to occur, and each threshold is updated to a value after the increase. After this process, the process returns to step S1.

In a case where the process has proceeded to step S8, the information notification section 212 decides whether it is time to perform the periodic transmission. The time to perform the periodic transmissions is stored in the NVRAM or the like in advance, and the information notification section 212 refers to the time information and makes a decision.

As a result of the decision, when it is not time to perform the periodic transmission ("No" in step S8 in FIG. 2), the process returns to step S1.

On the other hand, when it is time to perform the periodic transmission ("Yes" in step S8 in FIG. 2), the information notification section 212 first determines information to be transmitted to the server 1 to perform the periodic transmission. Specifically, the information notification section 212 decides whether the change-related transmission has been performed in a period (hereinafter, the previous period) between the time of the previous periodic transmission and the time of the determination (step S9 in FIG. 2). Specifically, the information notification section 212 makes a decision on the basis of the record of the transmission performed in step S6.

As a result of the decision, in a case where the change-related transmission has been performed in the previous period ("Yes" in step S9 in FIG. 2), the information notification section 212 transmits the first information (part of a plurality of parameter values of the device) to the server 1 (step S10 in FIG. 2). In this case, the information notification section 212 does not transmit the second information.

On the other hand, in a case where the change-related transmission has not been performed in the previous period ("No" in step S9 in FIG. 2), the information notification section 212 transmits the first information and the second information (a plurality of parameter values) to the server 1 (step S11 in FIG. 2). That is, the information notification section 212 transmits all of the information to be notified to the server 1.

Next, the information notification section 212 decreases the above-mentioned threshold of each significant parameter by a predetermined amount (step S12 in FIG. 2). This process makes it easy for the change-related transmission to occur, and each threshold is updated to a value after the decrease. Note that the amount of decrease in the threshold in this process is set to be larger than the amount of increase in the threshold in the process of step S7.

Next, in any case, the information notification section 212 stores in the NVRAM or the like the value of each significant parameter at the time after the periodic transmission (step S13 in FIG. 2). Thereafter, the process returns to step S1.

As described above, the information notification section 212 changes the threshold for the amount of change in each significant parameter so that the change-related transmission for transmitting all device information is performed between the periodic transmissions, and when the change-related transmission is performed within the period between the periodic transmissions, the first information alone is transmitted when the periodic transmission is performed. In addition, in a case where the change-related transmissions are performed two or more times within one period between the periodic transmissions, only information on the significant parameter in which the amount of change exceeds the threshold is transmitted in the second and subsequent change-related transmissions.

Figure 3:
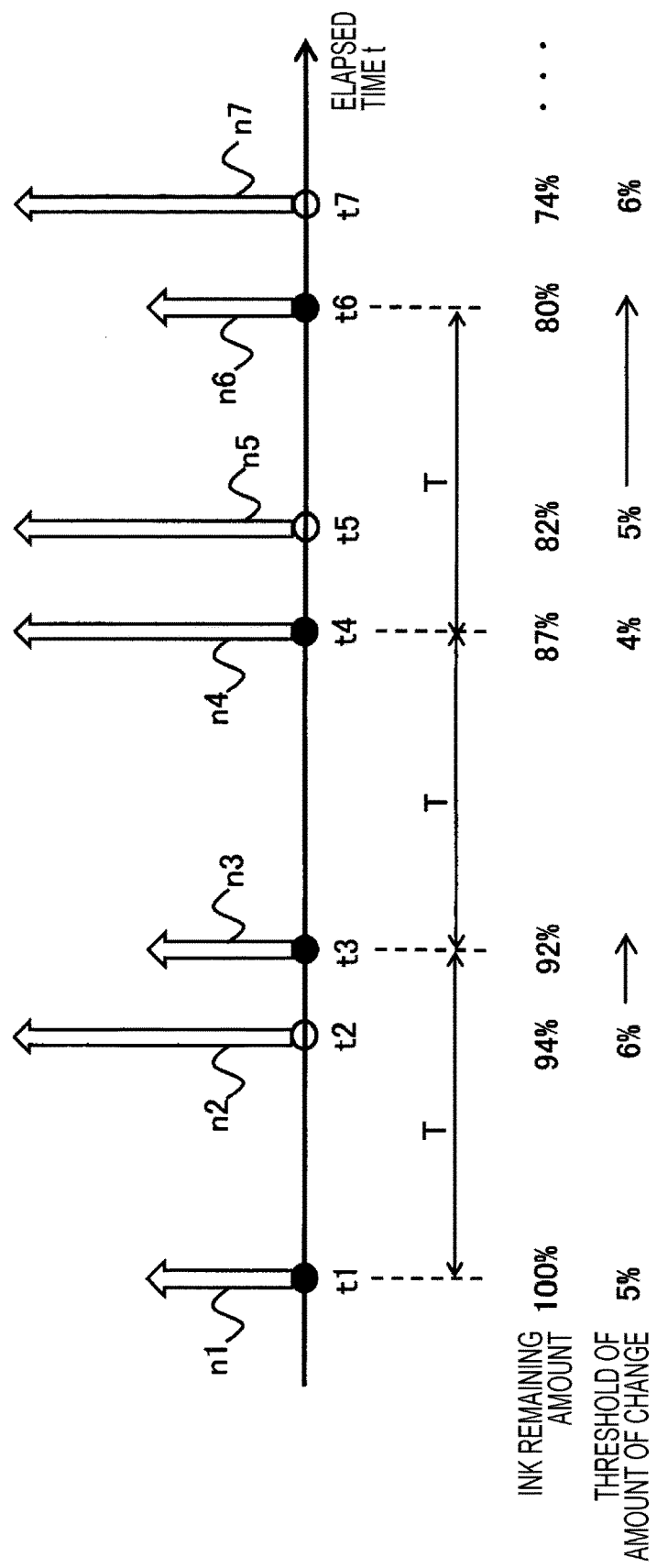
FIG. 3 is a diagram for describing a specific example of a process of transmitting device information.

Next, a specific example of a process of transmitting device information when the process is performed by the printer 2 will be described. FIG. 3 is a diagram for describing the specific example of the process of transmitting device information. The example illustrated in FIG. 3 assumes that information on the amount of ink remaining (%) of a predetermined color as a significant parameter is transmitted as the device information to the server 1. FIG. 3 illustrates that the periodic transmission is performed at times indicated by black circles and that the change-related transmission is performed at times indicated by white circles. Details of the process will be described below in accordance with the elapsed time t. The periodic transmission is performed at intervals of a predetermined period T.

At the time t1, the periodic transmission is performed by the information notification section 212. The device information n1 transmitted at this time is the first information. Further, as illustrated in FIG. 3, at this time, the amount of ink remaining is 100%, and the threshold of the amount of change set for the amount of ink remaining is 5%.

Thereafter, the printing is performed, and when the amount of change in the amount of ink remaining exceeds the threshold at the time t2, that is, the amount of ink remaining becomes 94%, the amount of change becomes 100%−94%=6%. Since the amount of change exceeds the threshold of 5%, the information notification section 212 performs the change-related transmission. Since it is the first time, since the time t1, that the change-related transmission is performed, the device information n2 transmitted at this time is the first information and the second information. Further, as described above, the threshold is increased to 6% at this time. The amount of increase is 1%.

Next, at the time t3, the periodic transmission is performed by the information notification section 212. At this time, since the change-related transmission is performed in the previous period, the first information is transmitted as the device information n3. At this time, the threshold is not updated, and the ink remaining amount which is 92% at the time is recorded.

Thereafter, during the predetermined period T, the amount of ink remaining does not change beyond 6%, that is, the change-related transmission is not performed, and the periodic transmission is performed by the information notification section 212 at the time t4. In this case, since the change-related transmission has not been performed during the previous period, the first information and the second information are transmitted as the device information n4. In addition, the threshold is decreased at this time and updated to 4%. The amount of decrease is 2%, which is larger than the above-mentioned amount of increase. In addition, the amount of ink remaining, which is 87% at the time, is recorded.

Thereafter, at the time t5, the amount of ink remaining becomes 82%, and the amount of change becomes 87%−82%=5%. Since the amount of change exceeds the threshold of 4%, the change-related transmission is performed by the information notification section 212. The first information and the second information are transmitted as the device information n5 at this time. In a similar way, the threshold is increased to 5%.

Thereafter, in a similar way, the periodic transmission is performed at the time t6, and the change-related transmission is performed at the time t7. At the time t7, the threshold is increased to 6%.

As described above, the threshold is changed so that the change-related transmission is performed once between the periodic transmissions, and the periodic transmission and the change-related transmission are repeatedly performed.

In the above-described embodiment, the printer 2 (device) itself transmits the device information to the server 1, which is an external apparatus. An embodiment may be employed in which instead of the printer 2, an information processing apparatus capable of communicating with the printer 2 transmits device information of the printer 2 to the server 1. In this case, the information processing apparatus can be the host computer of the printer 2.

Further, a configuration may be employed in which a representative printer connected to be able to communicate with a plurality of printers functions as the server 1 that receives device information of these printers.

As described above, the information processing apparatus (the information notification section 212) according to the embodiment of the invention and modifications thereof transmits the device information of the device (printer 2) to be managed to the external apparatus by using the periodic transmission and the change-related transmission together. In principle, the information processing apparatus transmits the first information when the periodic transmission is performed, and the information processing apparatus transmits the first information and the second information when the change-related transmission is performed. Therefore, it is possible to transmit adequate information at an appropriate time, and it is possible to reduce congestion of communication traffic to the external apparatus by increasing the amount of information in the change-related transmission in which transmission time is not likely to overlap with transmission time of other devices.

In addition, in a case where the change-related transmission is not performed between the periodic transmissions, the first information and the second information are transmitted when the periodic transmission is performed, so that the insufficient amount of the transmission information can be prevented.

In addition, since the change-related transmission is performed when the amount of change in the significant parameter exceeds the set threshold, it is possible to transmit information at an appropriate time.

In addition, the threshold is increased or decreased on the basis of whether the change-related transmission is performed, and the change-related transmission is performed approximately once between the periodic transmissions, so that notification of appropriate device information is realized.

Further, the amount of decrease in the threshold is made to be larger than the amount of increase in the threshold, and thus the change-related transmission is more likely to occur between the periodic transmissions, so that insufficient transmission of the device information can be avoided.

In addition, since the first information including the information on the significant parameters is transmitted with priority, efficient information transmission can be performed.

In addition, in a case where the change-related transmission is performed two or more times between the periodic transmissions, the information on the significant parameter alone which is attributed to the change-related transmission is transmitted when the second and subsequent change-related transmissions are performed, and therefore the efficient information transmission can be performed.

In the embodiment of the invention, the device to be managed is a printer. The device to be managed may be another device, for example, a scanner, a printer multifunction machine, a projector, or the like.

Note that the information notification section 212 may be referred to as a first transmission section or a second transmission section in accordance with the content of the process performed by the information notification section 212. For example, in a case where the information notification section 212 performs the periodic transmission, the information notification section 212 may be referred to as the first transmission section. Further, in a case where the information notification section 212 performs the change-related transmission, the information notification section 212 may be referred to as the second transmission section.

Further, in the embodiment of the invention, an example in which all device information is transmitted to the server 1 when the change-related transmission is performed has been described. All the device information might not necessarily be transmitted to the server 1 when the change-related transmission is performed. In an embodiment of the invention, for example, the significant parameter may be defined as the first information, the insignificant parameter as the second information, and the information belonging to neither as the third information, and the embodiment may be employed in which the first information and the second information are transmitted to the server 1 while the third information is not transmitted to the server 1 when the change-related transmission is performed.

In the embodiment of the invention, the time interval between periodic transmissions is fixed. However, it should be noted that it is sufficient that the periodic transmission be performed at a predetermined time of transmission, and the time interval between the periodic transmissions may not be fixed in an embodiment of the invention.

In the embodiment of the invention, an example in which a CPU (processor) executes each process is described.

Here, in this specification, the CPU may be constituted by one or a plurality of CPUs, or may be constituted by one or a plurality of integrated circuits (for example, an ASIC). Further, the CPU may be constituted by a combination of one or a plurality of CPUs and one or a plurality of integrated circuits.

The scope of the invention is not limited to the foregoing embodiments and includes the invention as described in the aspects of the invention and their equivalents.

The entire disclosure of Japanese Patent Application No. 2017-105372, filed May 29, 2017, is expressly incorporated by reference herein.

What is claimed is:

1. An information processing apparatus that transmits a plurality of parameter values of a device to an external apparatus, the information processing apparatus comprising:
    a first transmission section that selectively periodically transmits the plurality of parameter values or part of the plurality of parameter values; and
    a second transmission section that transmits the plurality of parameter values to the external apparatus, in a case where an amount of change in a predetermined parameter value included in the part of the plurality of parameter values satisfies a predetermined condition in a period between a previous periodic transmission and a current periodic transmission, after the predetermined condition is satisfied and before the current periodic transmission is performed,
    wherein the first transmission section transmits the plurality of parameter values to the external apparatus in the current periodic transmission in a case where the second transmission section does not transmit the plurality of parameter values to the external apparatus within the period, and
    wherein the first transmission section transmits the part of the plurality of parameter values to the external apparatus in the current periodic transmission in a case where the second transmission section transmits the plurality of parameter values to the external apparatus within the period.

2. The information processing apparatus according to claim 1, wherein
    the second transmission section transmits the plurality of parameter values to the external apparatus in a case where the amount of change in the predetermined parameter value after the previous periodic transmission exceeds a predetermined threshold in the period.

3. The information processing apparatus according to claim 2, wherein
    the second transmission section changes a value of the threshold to perform transmission of the plurality of parameter values once in the period.

4. The information processing apparatus according to claim 3, wherein
    the second transmission section increases the value of the threshold when the second transmission section transmits the plurality of parameter values to the external apparatus, and
    the first transmission section decreases the value of the threshold in the current periodic transmission in a case where the second transmission section does not transmit the plurality of parameter values to the external apparatus in the period.

5. The information processing apparatus according to claim 4, wherein an amount by which the value of the threshold is decreased is larger than an amount by which the value of the threshold is increased.

6. The information processing apparatus according to claim 3, wherein
the threshold has an upper limit value and a lower limit value.

7. The information processing apparatus according to claim 1, wherein
the second transmission section transmits a predetermined parameter value of the part of the plurality of parameter values to the external apparatus, after the second transmission section transmits the plurality of parameter values to the external apparatus in the period, in a case where an amount of change in the predetermined parameter value satisfies a predetermined condition in a period identical to the above period.

8. An information processing method for transmitting a plurality of parameter values of a device to an external apparatus, the method comprising:
transmitting selectively periodically the plurality of parameter values or part of the plurality of parameter values; and
transmitting the plurality of parameter values to the external apparatus in a case where an amount of change in a predetermined parameter value included in the part of the plurality of parameter values satisfies a predetermined condition in a period between a previous periodic transmission and a current periodic transmission, after the predetermined condition is satisfied and before the current periodic transmission is performed,
wherein the first transmission section transmits the plurality of parameter values to the external apparatus in the current periodic transmission in a case where the second transmission section does not transmit the plurality of parameter values to the external apparatus within the period, and
wherein the first transmission section transmits the part of the plurality of parameter values to the external apparatus in the current periodic transmission in a case where the second transmission section transmits the plurality of parameter values to the external apparatus within the period.

* * * * *

UNITED STATES PATENT AND TRADEMARK OFFICE
CERTIFICATE OF CORRECTION

PATENT NO. : 10,452,325 B2
APPLICATION NO. : 15/988942
DATED : October 22, 2019
INVENTOR(S) : Hiroyuki Suzuki et al.

It is certified that error appears in the above-identified patent and that said Letters Patent is hereby corrected as shown below:

On the Title Page

Left-hand Column, under Item (72) Lines 1-2:
Change inventor name from "Kyoichi KAMIJAMA" to --Kyoichi KAMIJIMA--

Signed and Sealed this
Eleventh Day of February, 2020

Andrei Iancu
*Director of the United States Patent and Trademark Office*